April 15, 1930.  L. S. WILBUR  1,754,248
SPLICE BAR OR FISH PLATE
Filed April 1, 1929  2 Sheets-Sheet 1
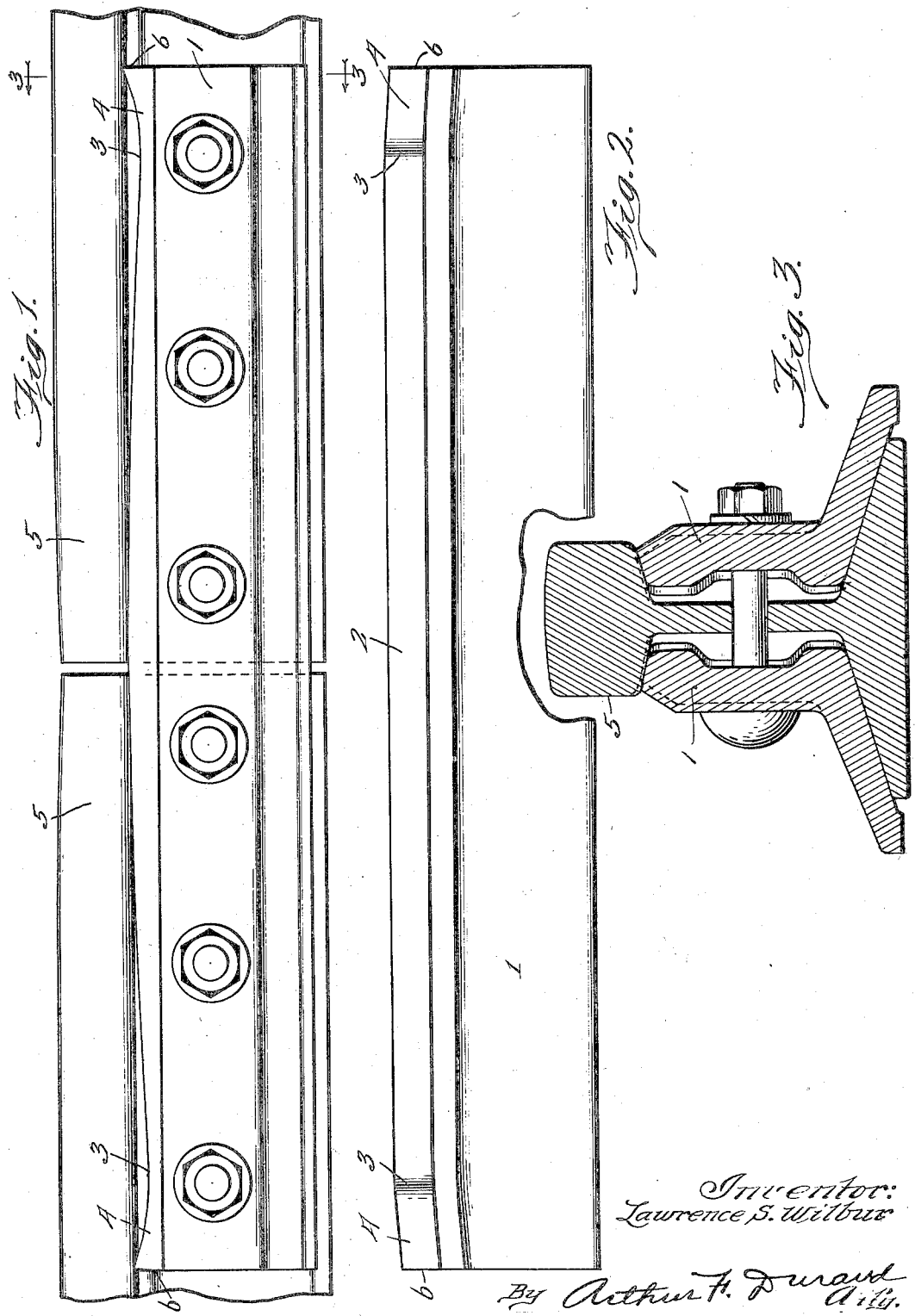

April 15, 1930.  L. S. WILBUR  1,754,248
SPLICE BAR OR FISH PLATE
Filed April 1, 1929   2 Sheets-Sheet 2
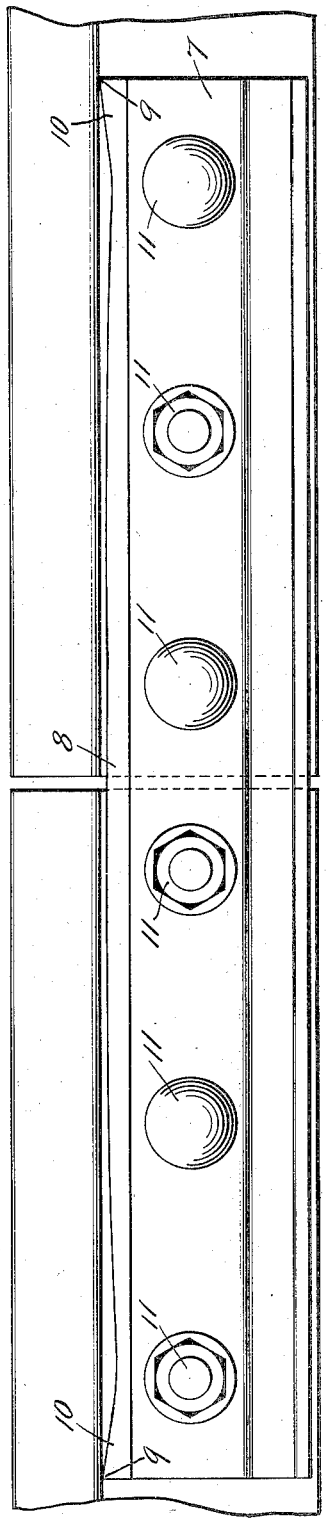
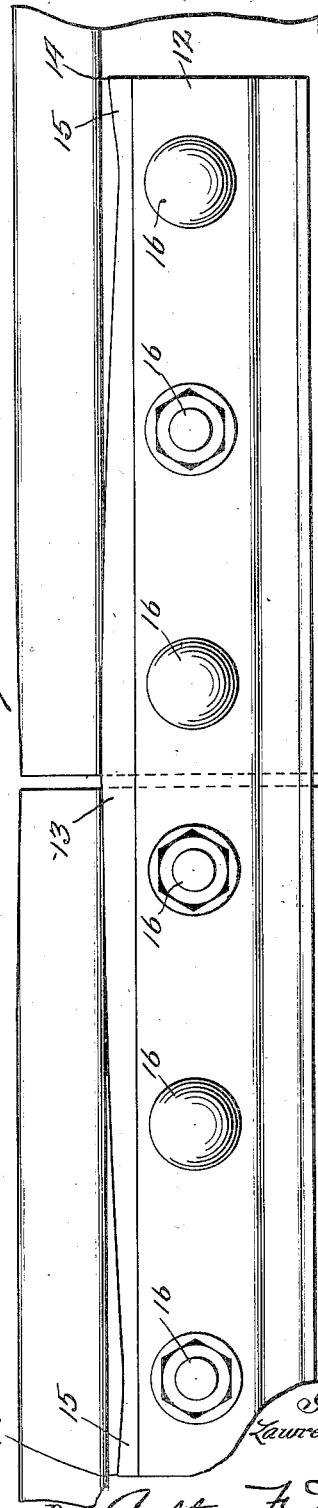

Patented Apr. 15, 1930

1,754,248

UNITED STATES PATENT OFFICE

LAWRENCE S. WILBUR, OF EVANSTON, ILLINOIS

SPLICE BAR OR FISHPLATE

Application filed April 1, 1929. Serial No. 351,643.

This invention relates to angle bars or splice bars or fish plates for rail joints, for either new or old rails, and to either new or old and reformed bars. These bars and the rails themselves become worn and distorted, by the pounding of the car wheels when they pass over the rail joints, and also by the creeping of the rails, caused by expansion and contraction thereof. From time to time, as is well known, the rail joint bolts are tightened in order to tighten the angle bars or fish plates against the sides of the rails. However, there is a limit to the extent to which this tightening can be done and after that the bars are taken off and reformed or reshaped. Sometimes they are reformed for the purpose of using them only on old rails, and sometimes they are reshaped for the purpose of using them on new rails.
Generally stated the object of the invention is to provide an angle bar or fish plate, and a method of reforming or reshaping angle bars or fish plates, of such character that the middle portion of the bar is straight, when viewed from above, while the ends of the bar are bent slightly outward, there being depressions in the top of the bar near the ends thereof, whereby the middle portion of the bar slopes gently in opposite directions toward said depressions, while the end portions of the bar slope for a shorter distance into said depressions, whereby reformed or reshaped bars, or even new bars, embodying the invention can be used to advantage on either old or new rails, and in either flexed or unflexed condition, depending upon the condition of the rails.

It is also an object to provide certain details and features of construction tending to increase the general efficiency and desirability of angle bars or fish plates, and the method of reforming or reshaping the angle bars, of this particular character.

To the foregoing and other useful things the invention consists in matters hereinafter set forth and claimed and shown in the accompanying drawings in which Fig. 1 is a side elevation of a rail joint having angle bars or fish plates embodying the principles of the invention, showing the bars applied to old and misshapen rails.

Fig. 2 is a plan of one of said bars.

Fig. 3 is a vertical transverse section on line 3—3 in Fig. 1.

Fig. 4 is a view similar to Fig. 1, showing a different form of the invention, and showing the angle bars or fish plates applied to new rails.

Fig. 5 is a view similar to Fig. 1, showing the angle bars or fish plates applied to old rails, and showing a different form of the invention.

As thus illustrated, referring to Figures 1, 2 and 3, the invention comprises an angle bar or fish plate 1 having a crowned or humped middle portion 2 which slopes gently into the depressions 3 near the ends of the bar. The end portions 4 of the upright portions of the bar or splice plate are bent outwardly, as shown in Figure 2 of the drawings so that these end portions are disposed at angles to the straight middle portion of the bar, when the latter is viewed from above. These portions 4 slope a relatively short distance into the said depressions 3, as shown in Figure 1 of the drawings. As is well known, the rails 5 become misshapen or distorted by the pounding of the car wheels as the latter pass over the rail joint, the ends of the tread portions of the rails becoming more or less mashed or flattened, so that these tread portions taper more or less toward the ends of the rails, when the latter are viewed from the side, as shown in Figure 1 of the drawings. When the bars 1 are applied to such misshapen or deformed rails, the portions 2 fit in under the tread portions of the rails so that the hump or crown of the middle portion of the bar supports the misshapen end portions of the treads of the rails. The end portions 4 of the angle bar support the tread portions of the rails at points where such tread portions are not misshapen or deformed. Because these end portions 4 are bent outwardly, it follows that the angle bar will fit in straight and without flexing when viewed from above. It will be noted that the extreme ends 6 of the end portions 4 are of the same height as the crown or humped middle portion 2 of the angle bar.

In Figure 4 of the drawings the angle bar or splice bar or fish plate 7 is similar to the one previously described, except that its humped or crowned middle portion 8 is not as high, so that the extreme ends 9 of the bar are slightly higher than the said middle portion 8, but these end portions 10 of the bar are bent outwardly as previously described. This bar 7, therefore, is suitable for new rails, and when applied to the latter springs inwardly along its middle portion, the bar flexing in this manner when the bolts 11 are tightened. This is because the end portions of the bar are higher than the middle portion, so that these end portions engage the undersides of the treads of the rails first, before the middle portion 8 has firmly engaged the undersides of said treads.

In Figure 5 of the drawings the angle bar or fish plate 12 is similar to the one shown in Figures 1, 2 and 3 of the drawings, but in this case the humped or crowned middle portion 13 of the bar is higher than the extreme ends 14 of the bar the end portions 15 of the top portion of the bar being bent outwardly as shown in Figure 2 of the drawings. This form of bar can be used on old rails, and when the bolts 16 are tightened the bar may or may not spring or flex, either inwardly or outwardly at its center, depending upon the worn or distorted condition of the rails.

Should the bar 1, or the bar 12, be used on new rails, it is obvious that the ends of the bar would flex or bend inwardly, when the bolts are all tightened, inasmuch as the humped or middle portion of the bar would acquire seating engagement first, so that the end portions of the bar would then move inwardly until the tops of the end portions are firmly seated against the underside of the tread portion of each rail. In this way the entire top of each bar may have seating engagement with the underside of the treads of the rails. Should the bar 7 be used on old rails, it would probably flex or bend inwardly at its middle portion, until the entire top of the bar is firmly seated against the underside of each tread portion of the rails.

Of course, the said angle bars or splice bars or fish plates can be made originally in the form shown and described, if such is desired. However, that would be more or less expensive, as ordinarily bars of this kind are made from long lengths of stock, the bars being formed by simply cutting the stock into shorter lengths as desired for the bars, so that each bar or fish plate is perfectly straight when originally made. Therefore, while the invention is not limited to any particular method of making the bars shown and described, it is preferable to collect old and worn and distorted angle bars or fish plates which can no longer be tightened firmly against the rails, and to reform or reshape them in any suitable manner, by any suitable means, in order to give them the form and shape shown and described. This is practicable for the reason that it practically costs no more to reshape or reform an angle bar, in order to give it some special shape or form, than it does to reshape or reform the bar to restore it to its original form or shape. Preferably, therefore, although not necessarily, the bars or fish plates shown and described are reshaped bars, made from old distorted bars or fish plates, by heating the bars and then reforming or reshaping them between dies of suitable character.

It will be seen, therefore, that in each form of the invention the base portion or flange of the splice bar or fish plate is perfectly straight along its outer edge when viewed from above, notwithstanding the outward deflection or out-turned position of the ends of the upper portion of the bar.

Thus, in each form of the invention, the extreme ends of the bar or fish plate do not represent the minimum height of the bar, as in each case the bar has portions which are of less height than the extreme ends of the bar.

It is obvious that the different bars shown and described can be used in combination with each other, on the same rail joint, or on successive rail joints of the same rail structure, depending upon the condition of the rails.

What I claim as my invention is:

1. A splice bar or fish plate having a crowned or humped middle portion, and having depressions in the top thereof near the ends of the bar, whereby the middle portion of the bar slopes gently toward and into said depressions, while the relatively short end portions of the bar slope toward the middle of the bar and into said depressions, said end portions of the bar being bent outwardly at angles to the middle portion of the bar, which middle portion is straight when the bar in normal condition is viewed from above.

2. A splice bar or fish plate as specified in claim 1, said end portions being also straight but disposed at opposite angles to said middle portion when viewed from above.

3. A splice bar or fish plate as specified in claim 1, the base portion of the bar being entirely straight from end to end at its outer edge when viewed from above.

4. A splice bar or fish plate as specified in claim 1, the ends of the bar being the same in height as the said humped or crowned middle portion of the bar.

5. A splice bar or fish plate as specified in claim 1, the ends of the bar being of less height than the said humped or crowned middle portion of the bar.

6. A splice bar or fish plate as specified in claim 1, the ends of the bar being greater in height than the said humped or crowned middle portion of the bar.

7. A splice bar or fish plate as specified in claim 1, the said middle portion of the bar being either straight or flexed and curved, either inwardly or outwardly, when viewed from above, when applied and bolted to the rails, depending upon the condition of the rails.

Specification signed this twenty-seventh day of March, 1929.

LAWRENCE S. WILBUR.